(12) United States Patent
Tang (10) Patent No.: US 7,885,015 B2
(45) Date of Patent: Feb. 8, 2011

(54) TWO-LENS TYPE OPTICAL LENS SYSTEM FOR TAKING IMAGE

(75) Inventor: Hsiang Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 50 days.

(21) Appl. No.: 12/014,091

(22) Filed: Jan. 14, 2008

(65) Prior Publication Data

US 2009/0091848 A1    Apr. 9, 2009

(30) Foreign Application Priority Data

Oct. 9, 2007    (TW) .............................. 96137859 A (51) Int. Cl.
  *G02B 13/18*    (2006.01)
  *G02B 9/06*    (2006.01)

(52) U.S. Cl. ....................................... 359/717; 359/794

(58) Field of Classification Search ................. 359/748, 359/708, 713–717, 754–757, 759–760, 763–764, 359/767–769, 771–772, 779–780, 784, 791–794; G02B 9/04, 9/06

See application file for complete search history.

(56) References Cited

U.S. PATENT DOCUMENTS

| 6,992,841 B2 * | 1/2006 | Saito et al. ................... 359/794 |
| 7,206,144 B2 * | 4/2007 | Tamura ....................... 359/793 |
| 2006/0087749 A1 * | 4/2006 | Saito .......................... 359/794 |

* cited by examiner

*Primary Examiner*—Ricky L Mack
*Assistant Examiner*—Zachary Wilkes
(74) *Attorney, Agent, or Firm*—Banger Shia (57) ABSTRACT

A two-lens type optical lens system for taking image consists two lens elements with refractive power, from the object side: a positive first lens element with a convex object-side surface and a concave image-side surface, both the object-side surface and the image-side surface of the first lens element being aspheric; a positive second lens element with a concave object-side surface and a convex image-side surface, both the object-side surface and the image-side surface of the second lens element being aspheric, and an aperture stop located in front of the first lens element. A focal length of the first lens element is f1, a focal length of the second lens element is f2, a focal length of the optical lens system is f, a radius of curvature of the object-side surface of the second lens element is R3, and they satisfy the relations: $f/f1>0.9$; $(f/f1)>(f/f2)>0.35$; and $1/R3<-0.01$ mm$^{-1}$.

12 Claims, 6 Drawing Sheets

TWO-LENS TYPE OPTICAL LENS SYSTEM FOR TAKING IMAGE

BACKGROUND OF THE INVENTION

1. Field of the Invention

The present invention relates to an optical lens system for taking image, and more particularly to a two-lens type optical lens system for taking image used in a mobile phone camera.

2. Description of the Prior Art

In recent years, with the popularity of mobile phone cameras, the length of such lens systems have been reduced continuously, and the sensor of a general digital camera is none other than CCD (Charge Coupled Device) or CMOS (Complementary Metal Oxide Semiconductor). Due to advances in semiconductor manufacturing, the pixel size of sensors has been reduced from the early 7.4 um to the current 1.75 um. Therefore, there's increasing demand for miniaturization of the lens system.

In consideration of aberration correction, a conventional mobile phone's lens assembly usually consists of three lens elements, one of the typical structures is the Triplet type. However, when the length of the lens assembly is reduced from 5 mm to less than 3 mm, less space is available for the optical system, making it difficult to incorporate three lens elements into the space of the optical system. Therefore, the lens elements must become thinner, causing poor uniformity if the lens is made from plastic injection molding.

The present invention mitigates and/or obviates the aforementioned disadvantages.

SUMMARY OF THE INVENTION

To solve the problem of the optical system for taking image, the present invention provides an optical system for taking image, which consists of two lens elements with refractive power and an aperture stop.

A two-lens type optical system for taking image in accordance with the present invention consists of two lens elements with refractive power, from the object side to the image side:

an aperture stop;

a first lens element with positive refractive power having a convex object-side surface and a concave image-side surface, both the object-side surface and the image-side surface of the first lens element being aspheric;

a second lens element with positive refractive power having a concave object-side surface and a convex image-side surface, both the object-side surface and the image-side surface of the second lens element being asphenic.

In the present two-lens type optical lens system for taking image, the refractive power of the system is mainly provided by the first lens element with positive refractive power, and the second lens element with positive refractive power serves to balance and correct the various aberrations caused by the system. Such arrangements can effectively improve the image quality.

The first lens element provides strong positive refractive power, and the aperture stop is located close to the object side, so that the exit pupil of the optical lens system will be far away from the image plane. Therefore, the light will be projected onto the sensor with a relatively small incident angle, this is the telecentric feature of the image side, and this feature is very important to the photosensitive power of the current solid-state sensor, and can improve the photosensitivity of the sensor while reducing the probability of the occurrence of shading.

In the present two-lens type optical lens system for taking image, plastic or glass material is introduced to make lens elements. The surface of lens element is aspheric, allowing more design parameters (than spherical surfaces), so as to better reduce the aberration and the number of the lens elements, so that the total track length of the system can be reduced effectively.

In the present two-lens type optical lens system for taking image, the focal length of the first lens element is f1, the focal length of the optical lens system is f, and they satisfy the relation: f/f1>0.9.

If the value of f/f1 is smaller than the above lower limit, the refractive power of the system will be weak, the total track length of the system will be too long, and it will be difficult to suppress the incident angle of the light with respect to the sensor. Further, it will be better if f/f1 satisfies the relation:

$$f/f1<1.25.$$

In the present two-lens type optical lens system for taking image, the focal length of the second lens element is f2, the focal length of the optical lens system is f, and they satisfy the relation:

$$0<f/f2<0.45.$$

The second lens element serves to balance and correct the various aberrations caused by the system. If the value of f/f2 is smaller than the above lower limit, the back focal length of the system will be too long. Further, it will be better if f/f2 satisfies the relation:

$$0.05<f/f2<0.25.$$

And it will be much better if f/f1 and f/f2 satisfy the relation:

$$(f/f1)-(f/f2)>0.35.$$

In the present two-lens type optical lens system for taking image, the radius of curvature of the object-side surface of the first lens element is R1, the radius of curvature of the image-side surface of the first lens element is R2, and they satisfy the relation:

$$0.45<R1/R2<0.7.$$

If the value of R1/R2 is lower than the lower limit as stated above, it will be difficult to correct the astigmatism caused by the system. On the other hand, if the value of R1/R2 is higher than the above upper limit, it will be difficult to correct the spherical aberration caused by the system. And it will be better, if the value of R1/R2 satisfies the relation:

$$0.5<R1/R2<0.65.$$

In the present two-lens type optical lens system for taking image, the radius of curvature of the object-side surface of the second lens element is R3, the radius of curvature of the image-side surface of the second lens element is R4, and they satisfy the relation:

$$0.85<R3/R4<1.4.$$

the above relation is helpful for correcting high order aberrations of the system.

And it will be better if the value of R3/R4 satisfies the relation:

$$0.95<R3/R4<1.35.$$

In the present two-lens type optical lens system for taking image, the refractive index of the first lens element is N1, and it satisfies the relation:

$$N1<1.59.$$

The above relation enables the system to obtain better image quality.

In the present two-lens type optical lens system for taking image, the Abbe number of the first lens element is V1, the Abbe number of the second lens element is V2, and they satisfy the relation:

|V1−V2|<10.

The above relation can effectively correct the Coma caused by the system.

In the present two-lens type optical lens system for taking image, the radius of curvature of the object-side surface of the second lens element is R3, when it satisfies the relation: 1/R3<−0.01 mm$^{-1}$, this contributes to correct the Coma of the system.

In the present two-lens type optical lens system for taking image, the radius of curvature of the image-side surface of the second lens element is R4, when it satisfies the relation: 1/R4<−0.01 mm$^{-1}$, the absolute value of the R4 is relatively small, which contributes to reducing the back focal length of the system.

In the present two-lens type optical lens system for taking image, the tangential angle of an image-side surface of the second lens element at the position of its effective optical diameter is ANG22, and it satisfies the relation:

ANG22<−50 deg.

The above relation can effectively reduce the incident angle of the light with respect to the sensor while improving the correction of the off axis aberration.

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This tangential angle is less than 90 degree in absolute value. The sign of the tangential angle is taken to be negative if N is closer than T to the object side of the optical lens system, and positive otherwise. In the present two-lens type optical lens system for taking image, the edge thickness of the first lens element is ET1, the focal length of the two-lens type optical lens system for taking image is f, and they satisfy the relation:

ET1<0.35 mm

ET1/f<0.2.

The above relations facilitate correction of astigmatism of the system.

The edge thickness is; the distance between two planes normal to the lens axis, the first of which is defined as the plane passing through points on the lens object-side surface at the position of its effective optical diameter, and the second defined as the plane passing through points on the lens image-side surface at the position of its effective optical diameter.

In the present two-lens type optical lens system for taking image, an object to be photographed is imaged on an electronic sensor, a total track length of the system is TL, a maximum image height of the system is ImgH, and they satisfy the relation:

TL/ImgH<2.2.

The above relation contributes to the miniaturization of the system.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
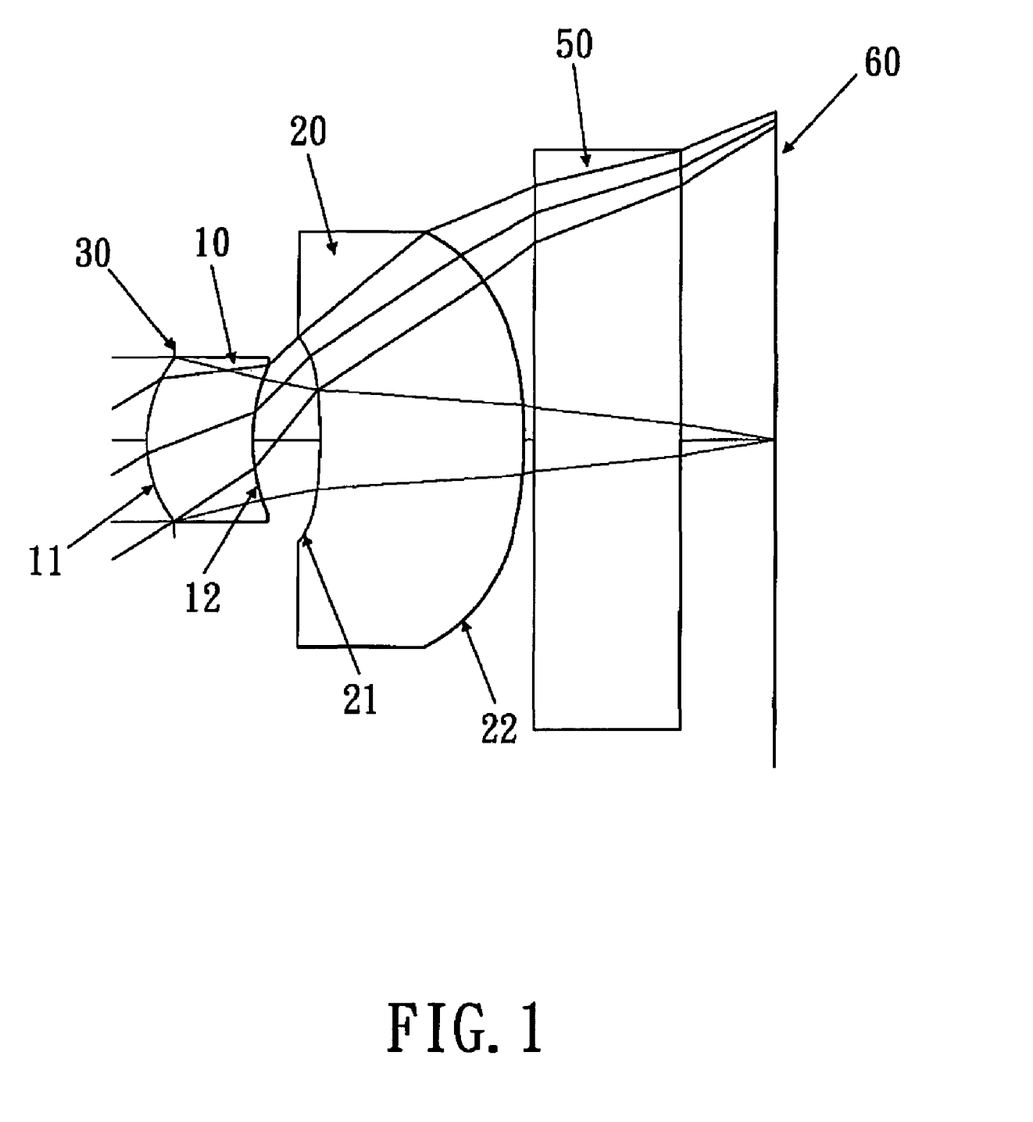
FIG. 1 shows an optical lens system for taking image in accordance with a first embodiment of the present invention.
Figure 2:
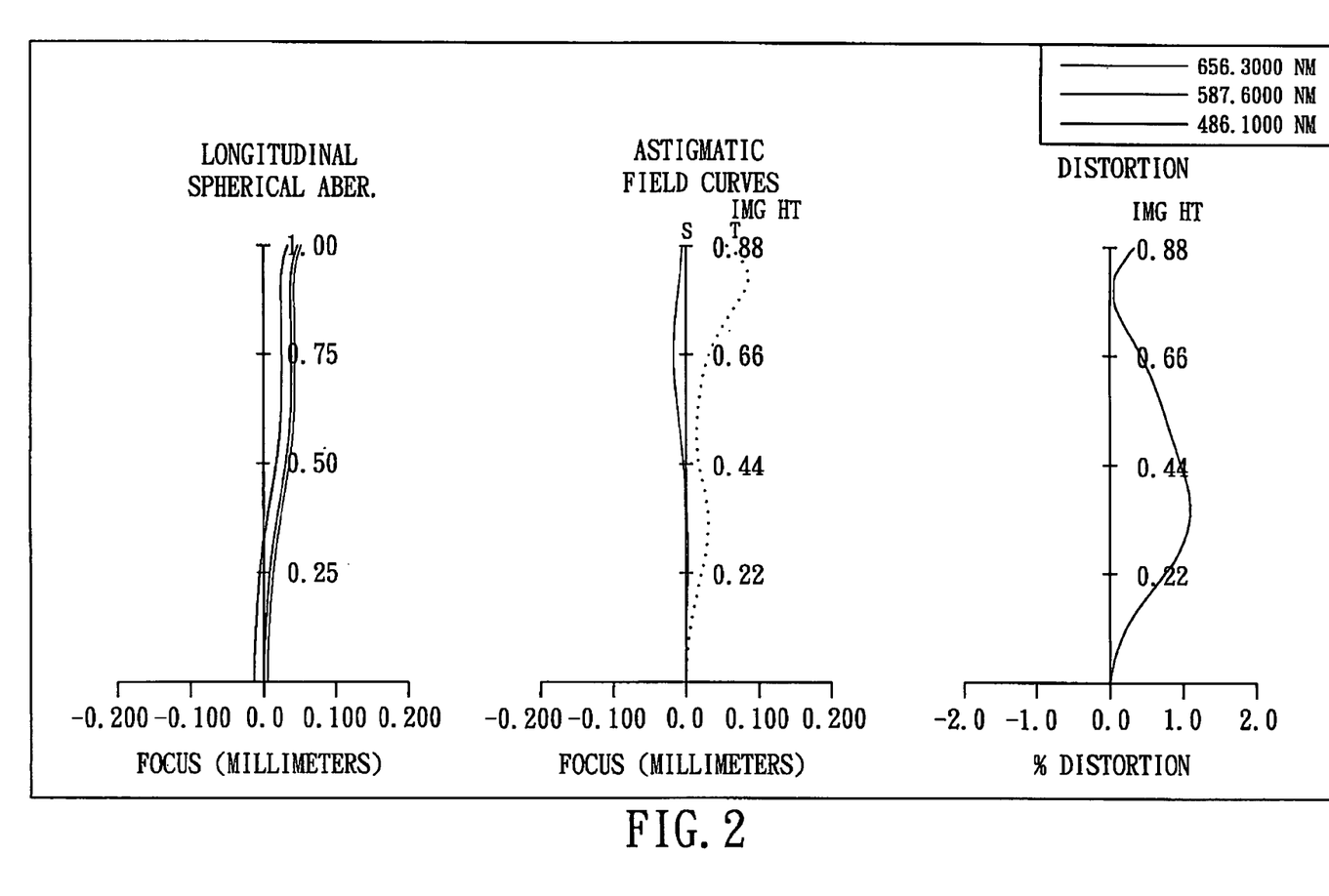
FIG. 2 shows the aberration curve of the first embodiment of the present invention.

Referring to FIG. 1, which shows a two-lens type optical lens system for taking image in accordance with a first embodiment of the present invention, and FIG. 2 shows the aberration curve of the first embodiment of the present invention. The first embodiment of the present invention is a two-lens type optical lens system for taking image consisting of two lens elements with refractive power, and the two-lens type optical lens system for taking image comprises: from the object side to the image side:

A plastic first lens element 10 with positive refractive power has a convex object-side surface 11 and a concave image-side surface 12, and both the object-side surface 11 and the image-side surface 12 of the first lens element 10 are aspheric.

A plastic second lens element 20 with positive refractive power has a concave object-side surface 21 and a convex image-side surface 22, and both the object-side surface 21 and the image-side surface 22 of the first lens element 20 are aspheric.

An aperture stop 30 is located in front of the first lens element 10.

A sensor cover glass 50 is located behind the second lens element 20 and has no influence on the focal length of the system.

An image plane 60 is located behind the sensor cover glass 50.

The equation of the curve of the aspheric surfaces is expressed as follows:

$$X(Y) = (Y^2/R)/(1+sqrt(1-(1+k)*(Y/R)^2)) + \sum_i (Ai)*(Y^i)$$

wherein:

X: the height of a point on the aspheric lens surface at a distance Y from the optical axis relative to the tangential plane of the aspheric surface vertex;

Y: the distance from the point on the curve of the aspheric surface to the optical axis;

k: the conic coefficient;

Ai: the aspheric surface coefficient of order i.

In the first embodiment of the present two-lens type optical lens system for taking image, the focal length of the first lens element is f1, the focal length of the second lens element is f2, the focal length of the two-lens type optical lens system for taking image is f, and they satisfy the relations:

$f1/f = 1.04$ $f/f2 = 0.19$ $f/f1 - f/f2 = 0.85.$

In the first embodiment of the present two-lens type optical lens system for taking image, the radius of curvature of the object-side surface of the first lens element is R1, the radius of curvature of the image-side surface of the first lens element is R2, the radius of curvature of the object-side surface of the second lens element is R3, the radius of curvature of the image-side surface of the second lens element is R4, and they satisfy the relations:

$1/R3 = -0.61 \text{ mm}^{-1}$ $1/R4 = -0.78 \text{ mm}^{-1}$ $R1/R2 = 0.59$ $R3/R4 = 1.29.$ In the first embodiment of the present two-lens type optical lens system for talking image, the refractive index of the first lens element is N1, and it satisfies the relation:

$N1 = 1.543$

In the first embodiment of the present two-lens type optical lens system for taking image, the Abbe number of the first lens element is V1, the Abbe number of the second lens element is V2, and they satisfy the relation:

$|V1 - V2| = 0$

In the first embodiment of the present two-lens type optical lens system for taking image, the tangential angle of an image-side surface of the second lens element at the position of its effective optical diameter is ANG22, and ANG22=−66.8 deg.

The definition of the tangential angle is the same as before.

In the first embodiment of the present two-lens type optical lens system for taking image, the total track length of the system is TL, the maximum image height of the system is ImgH, and they satisfy the relation:

$TL/ImgH = 1.94.$

In the first embodiment of the present two-lens type optical lens system for taking image, the edge thickness of the first lens element is ET1, the focal length of the two-lens type optical lens system for taking image is f, and they satisfy the relations:

$ET1 = 0.26 \text{ mm}$ $ET1/f = 0.20.$

The definition of the edge thickness is the same as before.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f (focal length) = 1.32 mm, Fno = 2.85,
HFOV (half of field of view) = 32.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.077 | | | | |
| 2 | Lens 1 | 0.39150(ASP) | 0.288 | Plastic | 1.543 | 56.5 | 1.27 |
| 3 | | 0.66698(ASP) | 0.185 | | | | |
| 4 | Lens 2 | −1.64379(ASP) | 0.548 | Plastic | 1.543 | 56.5 | 6.85 |
| 5 | | −1.27619(ASP) | 0.030 | | | | |
| 6 | Cover Glass | Plano | 0.400 | Glass | 1.517 | 64.2 | |
| 7 | | Plano | 0.250 | | | | |
| 8 | Image | Plano | | | | | |

TABLE 2

Aspheric Coefficients

| | Surface # | | | |
|---|---|---|---|---|
| | 2 | 3 | 4 | 5 |
| K = | −4.37912E−01 | −6.34894E−02 | −2.90270E+02 | −1.14455E+01 |
| A4 = | 3.16388E−01 | 1.67214E+00 | −1.13309E+01 | −3.54089E−01 |
| A6 = | 4.41682E+01 | 2.44412E+02 | 2.44816E+02 | −1.20303E+01 |
| A8 = | −3.69800E+02 | −1.01733E+04 | −5.03020E+03 | 8.03101E+01 |
| A10 = | −8.32340E+02 | 2.08590E+05 | 5.08493E+04 | −1.94648E+02 |
| A12 = | 4.90487E+04 | −1.40944E+06 | −2.63213E+05 | −5.11108E+02 |
| A14 = | −2.03976E+05 | 7.58510E+05 | 6.12515E+05 | 3.27313E+03 |
| A16 = | −1.51834E+05 | −4.93423E+04 | 4.24121E+04 | −4.48455E+03 |

Figure 3:
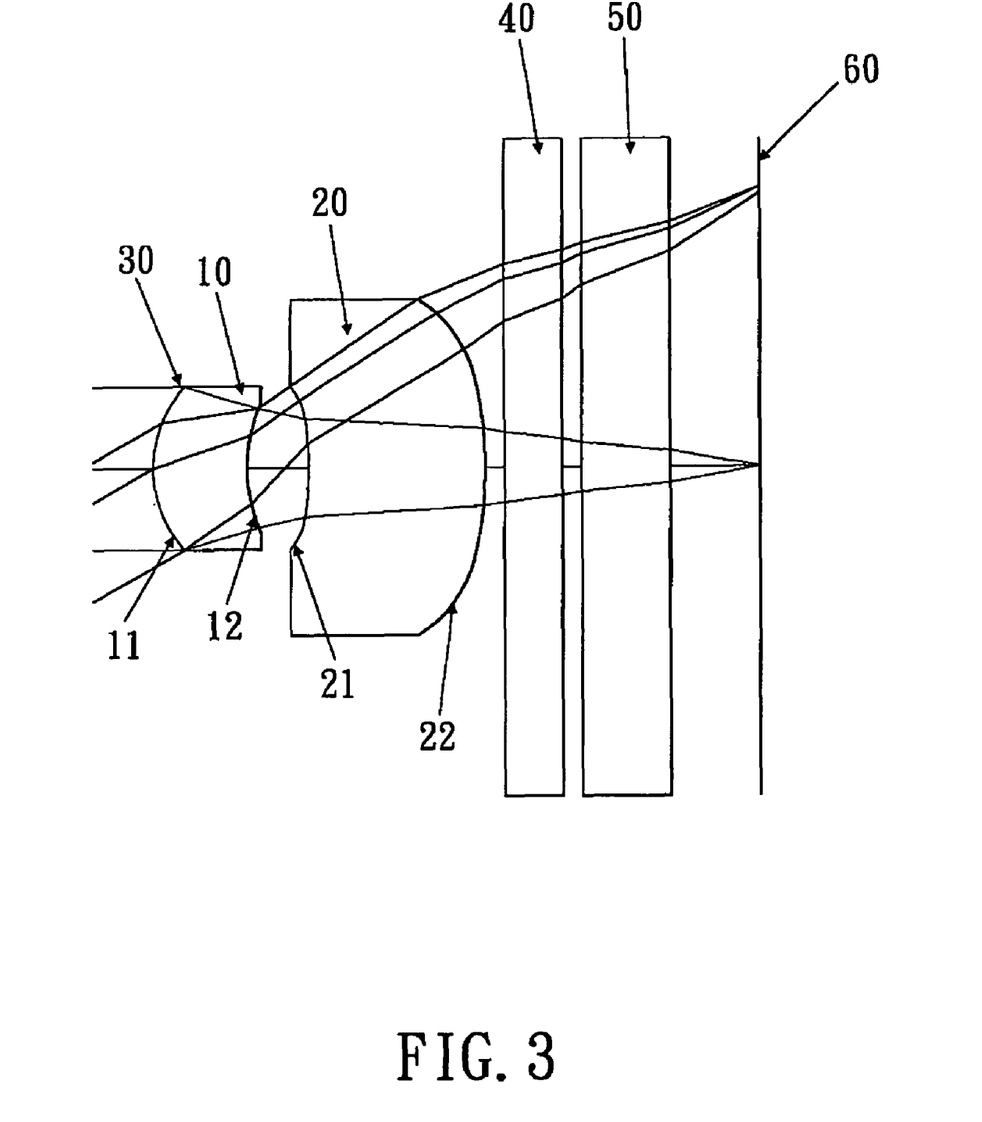
FIG. 3 shows an optical lens system for taking image in accordance with a second embodiment of the present invention.
Figure 4:
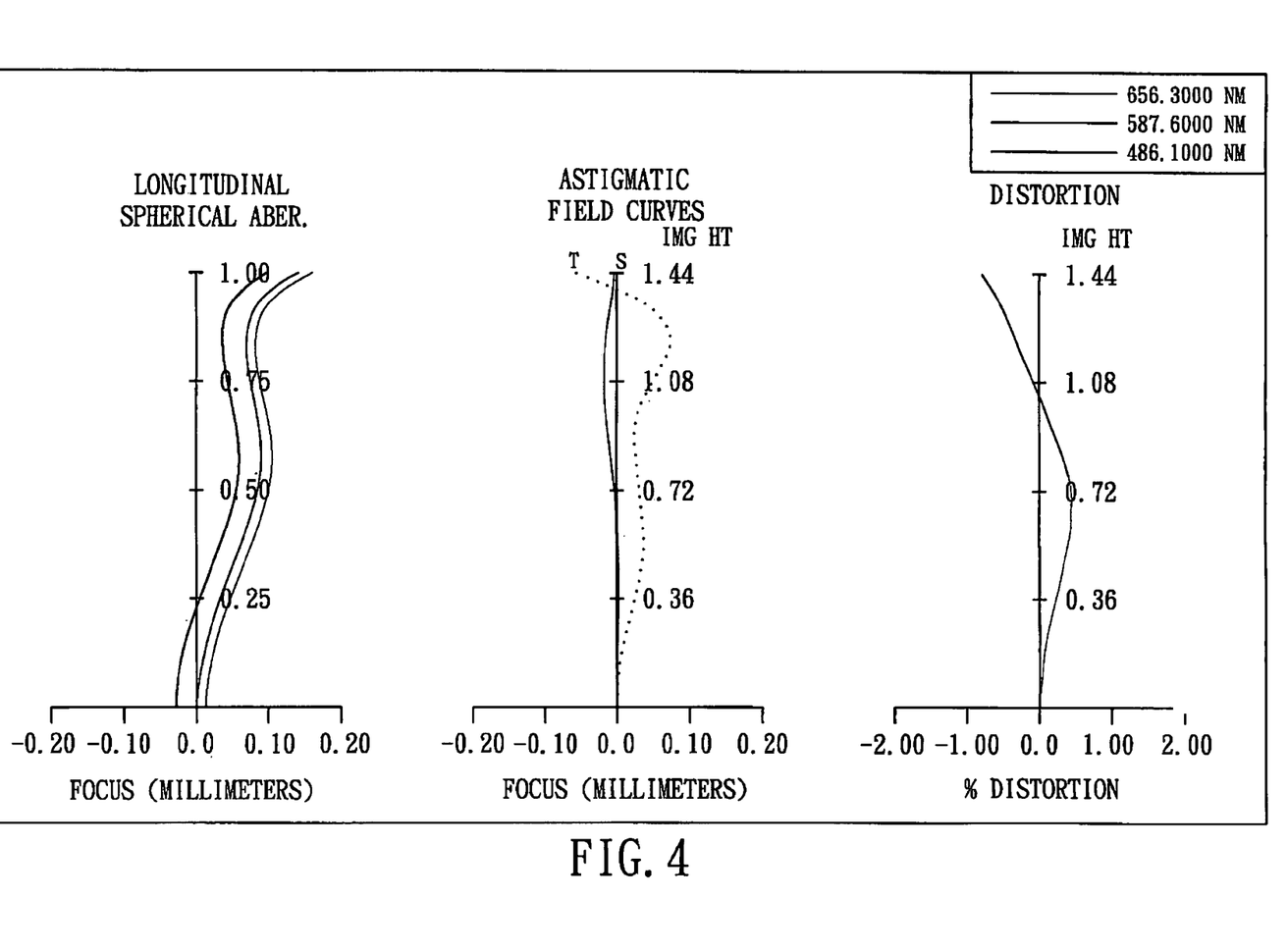
FIG. 4 shows the aberration curve of the second embodiment of the present invention.

Referring to FIG. 3, which shows a two-lens type optical lens system for taking image in accordance with a second embodiment of the present invention, and FIG. 4 shows the aberration curve of the second embodiment of the present invention. The second embodiment of the present invention is a two-lens type optical lens system for taking image consisting of two lens elements with refractive power, and the two-lens type optical lens system for taking image comprises: from the object side to the image side:

A plastic first lens element 10 with positive refractive power has a convex object-side surface 11 and a concave image-side surface 12, and both the object-side surface 11 and the image-side surface 12 of the first lens element 10 are aspheric.

A plastic second lens element 20 with positive refractive power has a concave object-side surface 21 and a convex image-side surface 22, and both the object-side surface 21 and the image-side surface 22 of the first lens element 20 are aspheric.

An aperture stop 30 is located in front of the first lens element 10.

An IR cut filter 40 is located behind the second lens element 20 and has no influence on the focal length of the system.

A sensor cover glass 50 is located behind the IR cut filter 40 and has no influence on the focal length of the system.

An image plane 60 is located behind the sensor cover glass 50.

The equation of the curves of the aspheric surfaces of the second embodiment has the same form as that of the first embodiment.

In the second embodiment of the present two-lens type optical lens system for taking image, the focal length of the first lens element is f1, the focal length of the second lens element is f2, the focal length of the two-lens type optical lens system for taking image is f, and they satisfy the relations:

$f1/f1=1.12$ $f/f2=0.10$ $f/f1-f/f2=1.02$.

In the second embodiment of the present two-lens type optical lens system for taking image, the radius of curvature of the object-side surface of the first lens element is R1, the radius of curvature of the image-side surface of the first lens element is R2, the radius of curvature of the object-side surface of the second lens element is R3, the radius of curvature of the image-side surface of the second lens element is R4, and they satisfy the relations:

$1/R3=-0.53$ mm$^{-1}$ $1/R4=-0.52$ mm$^{-1}$ $R1/R2=0.62$ $R3/R4=0.98$.

In the second embodiment of the present two-lens type optical lens system for taking image, the refractive index of the first lens element is N1, and it satisfies the relation:

$N1=1.543$

In the second embodiment of the present two-lens type optical lens system for taking image, the Abbe number of the first lens element is V1, the Abbe number of the second lens element is V2, and they satisfy the relation:

$|V1-V2|=0$

In the second embodiment of the present two-lens type optical lens system for taking image, the edge thickness of the first lens element is ET1, the focal length of the two-lens type optical lens system for taking image is f, and they satisfy the relations:

$ET1=0.40$ mm $ET1/f=0.16$.

The definition of the edge thickness is the same as before.

In the second embodiment of the present two-lens type optical lens system for taking image, the tangential angle of an image-side surface of the second lens element at the position of its effective optical diameter is ANG22, and $ANG22=-56.2$ deg.

The definition of the tangential angle is the same as before.

In the second embodiment of the present two-lens type optical lens system for taking image, the total track length of the two-lens type optical lens system is TL, the maximum image height of the two-lens type optical lens system is ImgH, and they satisfy the relation:

$TL/ImgH=2.14$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f (focal length) = 2.46 mm, Fno = 2.9,
HFOV (half of field of view) = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop/ Lens 1 | 0.64735(ASP) | 0.477 | Plastic | 1.543 | 56.5 | 2.19 |
| 2 | | 1.05138(ASP) | 0.308 | | | | |
| 3 | Lens2 | −1.88250(ASP) | 0.893 | Plastic | 1.543 | 56.5 | 24.3 |
| 4 | | −1.92279(ASP) | 0.100 | | | | |
| 5 | IR filter | Plano | 0.300 | Glass | 1.517 | 64.2 | |
| 6 | | Plano | 0.100 | | | | |
| 7 | Cover Glass | Plano | 0.450 | Glass | 1.517 | 64.2 | |

TABLE 3-continued (Embodiment 2)
f (focal length) = 2.46 mm, Fno = 2.9,
HFOV (half of field of view) = 30.0 deg.

| Surface # | | Curvature Radius | Thickness | Material | Index | Abbe # | Focal length |
|---|---|---|---|---|---|---|---|
| 8 | | Plano | 0.450 | | | | |
| 9 | Image | Plano | | | | | |

TABLE 4

Aspheric Coefficients

| | Surface # | | | |
|---|---|---|---|---|
| | 2 | 3 | 4 | 5 |
| K = | 0.00000E+00 | −6.67249E+00 | 0.00000E+00 | 1.00000E+00 |
| A4 = | −1.33595E−01 | 1.30406E+00 | −9.53159E−01 | −8.42790E−02 |
| A6 = | 2.67131E+00 | 7.03352E+00 | 3.60696E+00 | 7.10030E−03 |
| A8 = | −8.69897E+00 | −1.34183E+02 | −4.57290E+01 | −5.81401E−01 |
| A10 = | 5.62516E+00 | 1.18694E+03 | 1.43667E+02 | 9.89732E−01 |
| A12 = | 3.89553E+01 | −2.75284E+03 | −1.99135E+02 | −6.95112E−01 |

Figure 5:
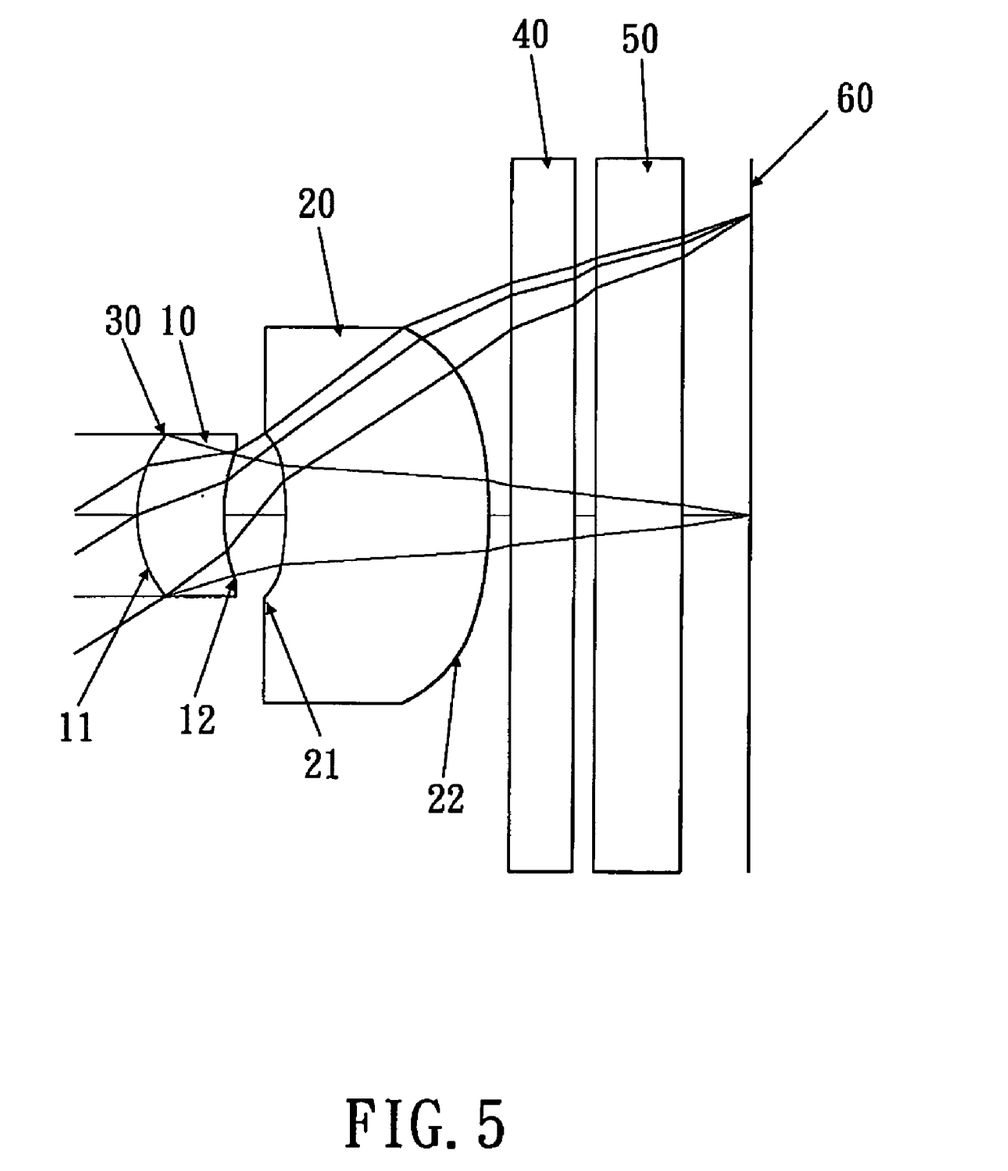
FIG. 5 shows an optical lens system for taking image in accordance with a third embodiment of the present invention.
Figure 6:
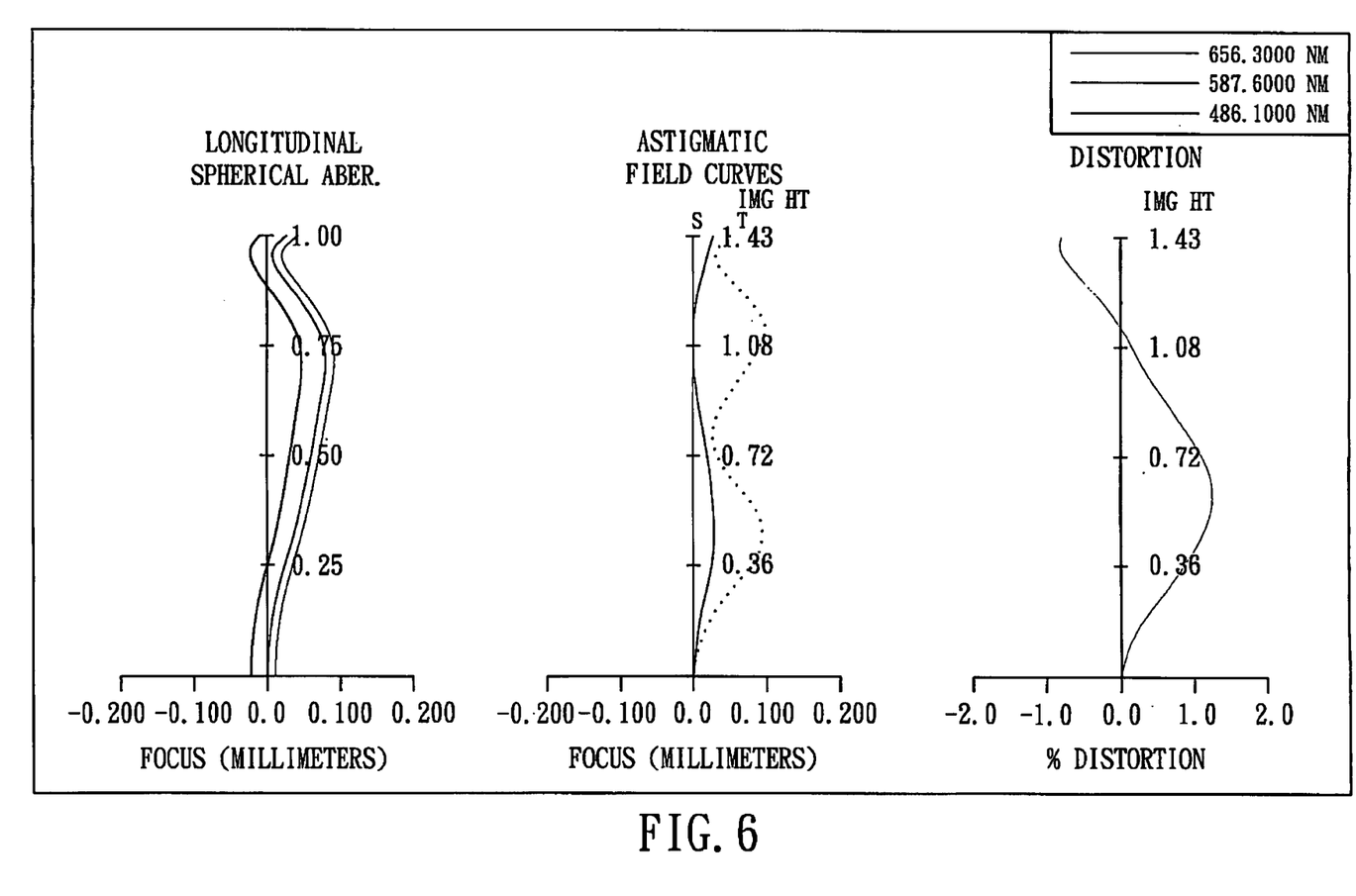
FIG. 6 shows the aberration curve of the third embodiment of the present invention.

Referring to FIG. 5, which shows a two-lens type optical lens system for taking image in accordance with a third embodiment of the present invention, and FIG. 6 shows the aberration curve of the third embodiment of the present invention. The third embodiment of the present invention is a two-lens type optical lens system for taking image consisting of two lens elements with refractive power, and the two-lens type optical lens system for taking image comprises: from the object side to the image side:

A plastic first lens element 10 with positive refractive power has a convex object-side surface 11 and a concave image-side surface 12, and both the object-side surface 11 and the image-side surface 12 of the first lens element 10 are aspheric.

A plastic second lens element 20 with positive refractive power has a concave object-side surface 21 and a convex image-side surface 22, and both the object-side surface 21 and the image-side surface 22 of the first lens element 20 are aspheric.

An aperture stop 30 is located in front of the first lens element 10.

An IR cut filter 40 is located behind the second lens element 20 and has no influence on the focal length of the system.

A sensor cover glass 50 is located behind the IR cut filter 40 and has no influence on the focal length of the system.

An image plane 60 is located behind the sensor cover glass 50.

The equation of the curves of the aspheric surfaces of the third embodiment has the same form as that of the first embodiment.

In the third embodiment of the present two-lens type optical lens system for taking image, the focal length of the first lens element is f1, the focal length of the second lens element is f2, the focal length of the two-lens type optical lens system for taking image is f, and they satisfy the relations:

$$f/f1=1.12$$

$$f/f2=0.16$$

$$f/f1-f/f2=0.96.$$

In the third embodiment of the present two-lens type optical lens system for taking image, the radius of curvature of the object-side surface of the first lens element is R1, the radius of curvature of the image-side surface of the first lens element is R2, the radius of curvature of the object-side surface of the second lens element is R3, the radius of curvature of the image-side surface of the second lens element is R4, and they satisfy the relations:

$$1/R3=-0.54 \text{ mm}^{-1}$$

$$1/R4=-0.57 \text{ mm}^{-1}$$

$$R1/R2=0.57$$

$$R3/R4=1.05.$$

In the third embodiment of the present two-lens type optical lens system for taking image, the refractive index of the first lens element is N1, and it satisfies the relation:

$$N1=1.543$$

In the third embodiment of the present two-lens type optical lens system for taking image, the Abbe number of the first lens element is V1, the Abbe number of the second lens element is V2, and they satisfy the relation:

$$|V1-V2|=0$$

In the third embodiment of the present two-lens type optical lens system for taking image, the edge thickness of the first lens element is ET1, the focal length of the two-lens type optical lens system for taking image is f, and they satisfy the relations:

$$ET1=0.34 \text{ mm}$$

$$ET1/f=0.15.$$

The definition of the edge thickness is the same as before.

In the third embodiment of the present two-lens type optical lens system for taking image, the tangential angle of an image-side surface of the second lens element at the position of its effective optical diameter is ANG22, and ANG22=−62.5 deg.

The definition of the tangential angle is the same as before.

In the third embodiment of the present two-lens type optical lens system for taking image, the total track length of the system is TL, the maximum image height of the system is ImgH, and they satisfy the relation:

$TL/ImgH=1.99$.

The detailed optical data of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 3)
f (focal length) = 2.21 mm, Fno = 2.85,
HFOV (half of field of view) = 32.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop/ Lens 1 | 0.61158(ASP) | 0.414 | Plastic | 1.543 | 56.5 | 1.98 |
| 2 | | 1.08069(ASP) | 0.279 | | | | |
| 3 | Lens 2 | −1.85541(ASP) | 0.960 | Plastic | 1.543 | 56.5 | 13.87 |
| 4 | | −1.76019(ASP) | 0.100 | | | | |
| 5 | IR filter | Plano | 0.300 | Glass | 1.517 | 64.2 | |
| 6 | | Plano | 0.100 | | | | |
| 7 | Cover Glass | Plano | 0.400 | Glass | 1.517 | 64.2 | |
| 8 | | Plano | 0.310 | | | | |
| 9 | Image | Plano | | | | | |

TABLE 6

Aspheric Coefficients

| | Surface # | | | |
|---|---|---|---|---|
| | 2 | 3 | 4 | 5 |
| K = | −5.22757E−02 | −3.18655E+00 | 8.58498E−01 | −2.72761E−02 |
| A4 = | −3.81844E−02 | 8.72919E−01 | −1.98682E+00 | −3.52299E−02 |
| A6 = | 7.25009E+00 | 9.05408E+00 | 2.37415E+01 | −3.37020E−01 |
| A8 = | −9.48652E+01 | −1.10828E+02 | −3.05086E+02 | 3.64891E−01 |
| A10 = | 6.36165E+02 | 7.01340E+02 | 1.64481E+03 | −4.50268E−01 |
| A12 = | −1.41475E+03 | 3.80505E+01 | −4.03874E+03 | 3.91933E−01 |
| A14 = | −1.76200E+02 | 1.66665E−02 | 2.13262E+01 | −3.50198E−01 |

TABLE 7

| | Embodiment 1 | Embodiment 2 | Embodiment 3 |
|---|---|---|---|
| f | 1.32 | 2.46 | 2.21 |
| Fno | 2.85 | 2.90 | 2.85 |
| HFOV | 32.9 | 30.0 | 32.9 |
| f/f1 | 1.04 | 1.12 | 1.12 |
| f/f2 | 0.19 | 0.10 | 0.16 |
| f/f1 − f/f2 | 0.85 | 1.02 | 0.96 |
| 1/R3 | −0.61 | −0.53 | −0.54 |
| 1/R4 | −0.78 | −0.52 | −0.57 |
| R1/R2 | 0.59 | 0.62 | 0.57 |
| R3/R4 | 1.29 | 0.98 | 1.05 |
| N1 | 1.543 | 1.543 | 1.543 |
| |V1 − V2| | 0.0 | 0.0 | 0.0 |
| ET1 | 0.26 | 0.40 | 0.34 |
| ET1/f | 0.20 | 0.16 | 0.15 |
| ANG22 | −66.8 | −56.2 | −62.5 |
| TL/ImgH | 1.94 | 2.14 | 1.99 |

What is claimed is:

1. A two-lens type optical lens system for taking image comprising two lens elements with refractive power, from the object side to the image side:
   an aperture stop;
   a plastic first lens element with positive refractive power having a convex object-side surface and a concave image-side surface, both the object-side surface and the image-side surface of the first lens element being aspheric;
   a second lens element with positive refractive power having a concave object-side surface and a convex image-side surface, both the object-side surface and the image-side surface of the second lens element being aspheric, wherein a focal length of the first lens element is f1, a focal length of the second lens element is f2, a focal length of the two-lens type optical lens system is f, a radius of curvature of the object-side surface of the second lens element is R3, and they satisfy the relations:

$f/f1 > 0.9$;

$(f/f1) - (f/f2) > 0.35$;

$-0.9 \text{ mm}^{-1} < 1/R3 < -0.35 \text{ mm}^{-1}$;

an object to be photographed is imaged on an electronic photosensitive assembly, a total track length of the system is TL, a maximum image height of the system is ImgH, and they satisfy the relation:

$TL/ImgH < 2.2$ in the two-lens type optical lens system for taking image, the number of the lens elements with refractive power being limited to two.

2. The two-lens type optical lens system for taking image as claimed in claim 1, wherein the focal length of the first lens element is f1, the focal length of the two-lens type optical lens system is f, and they satisfy the relation: $f/f1 < 1.25$.

3. The two-lens type optical lens system for taking image as claimed in claim 1, wherein the focal length of the second lens element is f2, the focal length of the two-lens type optical lens system is f, and they satisfy the relation: $0 < f/f2 < 0.45$.

4. The two-lens type optical lens system for taking image as claimed in claim 3, wherein the focal length of the second lens element is f2, the focal length of the two-lens type optical lens system is f, and they satisfy the relation: $0.05 < f/f2 < 0.25$.

5. The two-lens type optical lens system for taking image as claimed in claim 1, wherein a refractive index of the first lens element is N1, and it satisfies the relation: $N1 < 1.59$.

6. The two-lens type optical lens system for taking image as claimed in claim 1, wherein a radius of curvature of the image-side surface of the second lens element is R4, and it satisfies the relation: $1/R4 < -0.01 \text{ mm}^{-1}$.

7. The two-lens type optical lens system for taking image as claimed in claim 1, wherein an Abbe number of the first lens element is V1, an Abbe number of the second lens element is V2, and they satisfy the relation: $|V1 - V2| < 10$.

8. The two-lens type optical lens system for taking image as claimed in claim 1, wherein a tangential angle of an image-side surface of the second lens element at a position of its effective optical diameter is ANG22, and it satisfies the relation: $ANG22 < -50$ deg.

9. The two-lens type optical lens system for taking image as claimed in claim 1, wherein the second lens element is made of plastic material.

10. The two-lens type optical lens system for taking image as claimed in claim 9, wherein a radius of curvature of the object-side surface of the first lens element is R1, a radius of curvature of the image-side surface of the first lens element is R2, and they satisfy the relation: $0.45 < R1/R2 < 0.7$, a radius of curvature of the object-side surface of the second lens element is R3, a radius of curvature of the image-side surface of the second lens element is R4, and they satisfy the relation: $0.85 < R3/R4 < 1.4$.

11. The two-lens type optical lens system for taking image as claimed in claim 10, wherein the radius of curvature of the object-side surface of the first lens element is R1, the radius of curvature of the image-side surface of the first lens element is R2, and they satisfy the relation: $0.5 < R1/R2 < 0.65$, the radius of curvature of the object-side surface of the second lens element is R3, the radius of curvature of the image-side surface of the second lens element is R4, and they satisfy the relation: $0.95 < R3/R4 < 1.35$.

12. The two-lens type optical lens system for taking image as claimed in claim 10, wherein an edge thickness of the first lens element is ET1, the focal length of the two-lens type optical lens system for taking image is f, and they satisfy the relations: $ET1 < 0.35$ mm $ET1/f < 0.2$.

* * * * *